United States Patent
Subrahmanyam et al.

(10) Patent No.: US 10,223,026 B2
(45) Date of Patent: *Mar. 5, 2019

(54) CONSISTENT AND EFFICIENT MIRRORING OF NONVOLATILE MEMORY STATE IN VIRTUALIZED ENVIRONMENTS WHERE DIRTY BIT OF PAGE TABLE ENTRIES IN NON-VOLATILE MEMORY ARE NOT CLEARED UNTIL PAGES IN NON-VOLATILE MEMORY ARE REMOTELY MIRRORED

(71) Applicant: VMware, Inc., Palo Alto, CA (US)

(72) Inventors: Pratap Subrahmanyam, Saratoga, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/042,288

(22) Filed: Sep. 30, 2013

(65) Prior Publication Data

US 2015/0095585 A1 Apr. 2, 2015

(51) Int. Cl.
*G06F 3/06* (2006.01)
*G06F 11/14* (2006.01)
(Continued)

(52) U.S. Cl.
CPC ............ *G06F 3/0647* (2013.01); *G06F 3/062* (2013.01); *G06F 3/0683* (2013.01); *G06F 11/14* (2013.01);
(Continued)

(58) Field of Classification Search
CPC combination set(s) only.
See application file for complete search history.

(56) References Cited

U.S. PATENT DOCUMENTS 4,020,466 A * 4/1977 Cordi ................. G06F 11/1451
5,276,860 A * 1/1994 Fortier et al. ................. 714/6.3
(Continued)

FOREIGN PATENT DOCUMENTS

| JP | H056308 A | 1/1993 |
|---|---|---|
| JP | 2013045285 A | 3/2013 |
| WO | 2010/088437 A2 | 8/2010 |

OTHER PUBLICATIONS

Jim Handy. 1993. The Cache Memory Book. Academic Press Prof., Inc., San Diego, CA, USA.*
(Continued)

*Primary Examiner* — Ann J Lo
*Assistant Examiner* — Chie Yew
(74) *Attorney, Agent, or Firm* — Patterson & Sheridan, LLP

(57) ABSTRACT

Updates to nonvolatile memory pages are mirrored so that certain features of a computer system, such as live migration of applications, fault tolerance, and high availability, will be available even when nonvolatile memory is local to the computer system. Mirroring may be carried out when a cache flush instruction is executed to flush contents of the cache into nonvolatile memory. In addition, mirroring may be carried out asynchronously with respect to execution of the cache flush instruction by retrieving content that is to be mirrored from the nonvolatile memory using memory addresses of the nonvolatile memory corresponding to target memory addresses of the cache flush instruction.

20 Claims, 10 Drawing Sheets

(51) Int. Cl.
  *G06F 11/16* (2006.01)
  *G06F 11/20* (2006.01)
(52) U.S. Cl.
  CPC ...... *G06F 11/1484* (2013.01); *G06F 11/1666* (2013.01); *G06F 11/2097* (2013.01); *G06F 11/20* (2013.01)

(56) References Cited

U.S. PATENT DOCUMENTS

| | | | |
|---|---|---|---|
| 5,359,713 A * | 10/1994 | Moran et al. .................. 710/52 |
| 5,953,729 A | 9/1999 | Cabrera et al. |
| 6,078,992 A * | 6/2000 | Hum .......................... 711/122 |
| 6,205,521 B1 | 3/2001 | Schumann |
| 6,324,654 B1 | 11/2001 | Wahl et al. |
| 6,349,366 B1 | 2/2002 | Razdan et al. |
| 6,415,362 B1 | 7/2002 | Hardage et al. |
| 6,782,453 B2 * | 8/2004 | Keltcher ............ G06F 12/0804 711/133 |
| 6,996,640 B1 | 2/2006 | Hill et al. |
| 7,526,634 B1 * | 4/2009 | Duluk et al. ................... 712/216 |
| 7,606,841 B1 * | 10/2009 | Ranade ............ G06F 17/30575 707/615 |
| 8,127,174 B1 | 2/2012 | Shah et al. |
| 2002/0042863 A1 | 4/2002 | Jeddeloh |
| 2002/0065998 A1 * | 5/2002 | Buckland ............ G06F 11/2058 711/162 |
| 2002/0112129 A1 * | 8/2002 | Arimilli et al. ............... 711/141 |
| 2002/0129191 A1 | 9/2002 | DaCosta |
| 2003/0126416 A1 * | 7/2003 | Marr et al. .................... 712/235 |
| 2003/0145176 A1 | 7/2003 | Dvir et al. |
| 2004/0044838 A1 | 3/2004 | Nickel et al. |
| 2004/0128447 A1 * | 7/2004 | Lai ............................... 711/133 |
| 2004/0153694 A1 * | 8/2004 | Nicholson et al. .............. 714/4 |
| 2004/0162950 A1 * | 8/2004 | Coulson ............ G06F 12/0804 711/141 |
| 2004/0181634 A1 | 9/2004 | Taylor et al. |
| 2004/0250034 A1 * | 12/2004 | Yagawa ............. G06F 11/2058 711/162 |
| 2005/0071549 A1 | 3/2005 | Tross et al. |
| 2005/0188169 A1 * | 8/2005 | Fujibayashi ................... 711/170 |
| 2005/0195635 A1 * | 9/2005 | Conley et al. ................. 365/149 |
| 2005/0235131 A1 * | 10/2005 | Ware .................. G06F 12/0292 711/203 |
| 2005/0278483 A1 * | 12/2005 | Andruszkiewicz .......................... G06F 11/1076 711/114 |
| 2006/0101085 A1 | 5/2006 | Soulier et al. |
| 2007/0067382 A1 | 3/2007 | Sun |
| 2007/0101186 A1 | 5/2007 | Chen |
| 2008/0098157 A1 | 4/2008 | Andrewartha et al. |
| 2008/0215802 A1 | 9/2008 | Chow et al. |
| 2008/0276043 A1 * | 11/2008 | Hetzler ................. G06F 3/0614 711/114 |
| 2009/0222627 A1 * | 9/2009 | Reid .................... G06F 12/0804 711/135 |
| 2010/0110775 A1 * | 5/2010 | Yoon ........................ G11C 11/16 365/158 |
| 2010/0153646 A1 * | 6/2010 | Chen .................... G06F 12/0897 711/122 |
| 2010/0185816 A1 | 7/2010 | Sauber et al. |
| 2010/0199042 A1 * | 8/2010 | Bates et al. .................... 711/114 |
| 2010/0229173 A1 | 9/2010 | Subrahmanyam et al. |
| 2010/0332727 A1 * | 12/2010 | Kapil ...................... G06F 12/08 711/103 |
| 2011/0153952 A1 * | 6/2011 | Dixon ................. G06F 12/0891 711/135 |
| 2012/0011504 A1 | 1/2012 | Ahmad et al. |
| 2013/0067169 A1 | 3/2013 | Orf et al. |
| 2013/0318196 A1 | 11/2013 | Yamamoto et al. |
| 2014/0297919 A1 * | 10/2014 | Nachimuthu ........ G11C 14/009 711/102 |

OTHER PUBLICATIONS

Handy, Jim. The Cache Memory Book, 2nd edition, Academic Press 1998. p. 44-46. TK7895.M4H35 1998.*
International Search Report and Written Opinion dated Nov. 17, 2014 for Application No. PCT/US2014/042980.
Office Action dated Apr. 23, 2015 in related U.S. Appl. No. 14/042,292.
Final Office Action dated Aug. 20, 2015 in related U.S. Appl. No. 14/042,292.
Jim Handy, The Cache Memory Book, 2nd edition, Academic Press 1998. p. 44-46. TK7895.M4H35 1998.
SDRAM Tektronix. Article [online]. Tektronix, 2009 [retrieved on Feb. 23, 2016]. Retrieved from the Internet <http://cn.tek.com/di/54W-21473-2_0.pdf>.
Victor Siber & Marilyn Smith Dawkins, Claiming Computer-Related Inventions As Articles of Manufacture, 35 IDEA 13 (1994).
Japanese Application No. 2016-518183, Office Action dated Jan. 24, 2017 consists of 2 pages.
Australian Search Report dated Nov. 14, 2016 in related Australian Patent Application 20140328735.

* cited by examiner

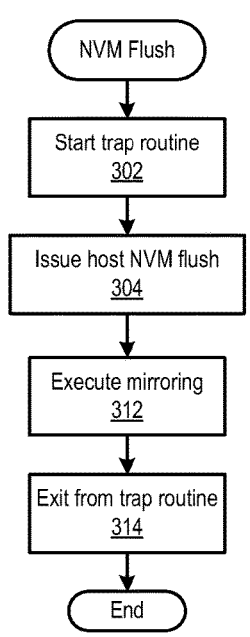
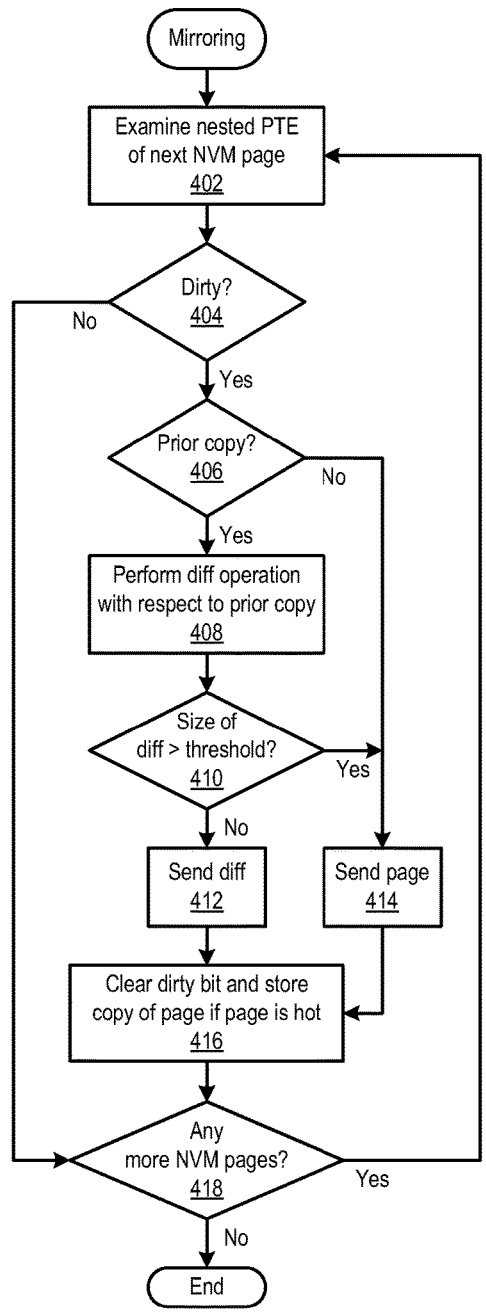
FIGURE 3
FIGURE 4

CONSISTENT AND EFFICIENT MIRRORING OF NONVOLATILE MEMORY STATE IN VIRTUALIZED ENVIRONMENTS WHERE DIRTY BIT OF PAGE TABLE ENTRIES IN NON-VOLATILE MEMORY ARE NOT CLEARED UNTIL PAGES IN NON-VOLATILE MEMORY ARE REMOTELY MIRRORED

BACKGROUND

Computer hardware providers are building experimental prototype computer systems with nonvolatile memory that is byte-addressable. In such systems, the nonvolatile memory can be directly mapped by applications in a manner similar to volatile memory and a processing unit's load and store instructions can be used to access the nonvolatile memory. In such computer systems, the only difference between volatile memory and nonvolatile memory is that any modifications made by store instructions to the nonvolatile memory will be persisted.

When computer systems with byte-addressable nonvolatile memory are used as host systems for virtual machines and a hypervisor for supporting the execution of the virtual machines provides a virtual hardware platform that includes the virtualized nonvolatile memory, it can no longer be assumed that all persistent state of virtual machines resides in storage systems. As a result, features of virtualized computer system, such as live migration of virtual machines, fault tolerance, and high availability, which have been enabled by employing shared storage systems, may not be available because of the persistent state of the virtual machines residing in the nonvolatile memory.

SUMMARY

One or more embodiments provide techniques for mirroring the nonvolatile memory so that certain features of a computer system, such as live migration of applications, fault tolerance, and high availability, will be available even when nonvolatile memory is local to the computer system. In one embodiment, mirroring is carried out when a cache flush instruction is executed to flush contents of the cache into nonvolatile memory (referred to herein as "NVM flush" instruction). In additional embodiments, mirroring is carried out asynchronously with respect to execution of the NVM flush instruction and content that is to be mirrored is retrieved from the nonvolatile memory using memory addresses of the nonvolatile memory corresponding to target memory addresses of the NVM flush instruction.

A method of mirroring updates to a nonvolatile memory, according to a first embodiment, includes the steps of determining that an instruction to flush a cache into the nonvolatile memory has been issued, writing contents of the cache into the nonvolatile memory, and transmitting at least the contents of the cache that have been written into the nonvolatile memory to a remote computer system. The step of transmitting may be carried out synchronously or asynchronously with respect to the step of writing. When it is carried out asynchronously, the step of transmitting is carried out as a part of a periodically executing mirroring thread.

A method of mirroring updates to a nonvolatile memory, according to a second embodiment, includes the first step of reading cached data and a memory address stored in a dirty cache line and, synchronously therewith, storing the memory address in a buffer and storing the cached data at the memory address, and the second step of mirroring the cached data stored at the memory address by reading the memory address stored in the buffer, reading the cached data located at the memory address, and transmitting the cached data located at the memory address to a remote computer system.

A method of mirroring updates to a nonvolatile memory, according to a third embodiment, includes the steps of updating a cache line with new cached data and a new memory address, storing the new cached data at the new memory address and conditionally storing the new memory address in a buffer based on whether or not the state of the updated cache line transitioned from a clean state to a dirty state as a result of the updating, and mirroring the new cached data stored at the new memory address.

A method of mirroring updates to a nonvolatile memory, according to a fourth embodiment, includes the steps of updating cache lines of a first cache and a second cache, storing a memory address of the updated cache line in a first buffer if the updated cache line is in the first cache and became dirty as a result of the updating and in a second buffer if the updated cache line is in the second cache and became dirty as a result of the updating, storing data of the updated cache lines in the nonvolatile memory at the memory addresses stored in the first and second buffers, and mirroring the data of the updated cache lines stored at the memory addresses stored in the first and second buffers.

Further embodiments include, without limitation, a non-transitory computer-readable storage medium that includes instructions that enable a computer system to implement one or more aspects of the above methods as well as a computer system configured to implement one or more aspects of the above methods.

BRIEF DESCRIPTION OF THE DRAWINGS

FIG. 3 is a flow diagram of a method carried out by the hypervisor in which the steps of mirroring are executed in response to and upon completion of an NVM flush instruction.

FIG. 4 is a flow diagram showing a method of mirroring dirty cache data according to an embodiment.

DETAILED DESCRIPTION

Figure 1:
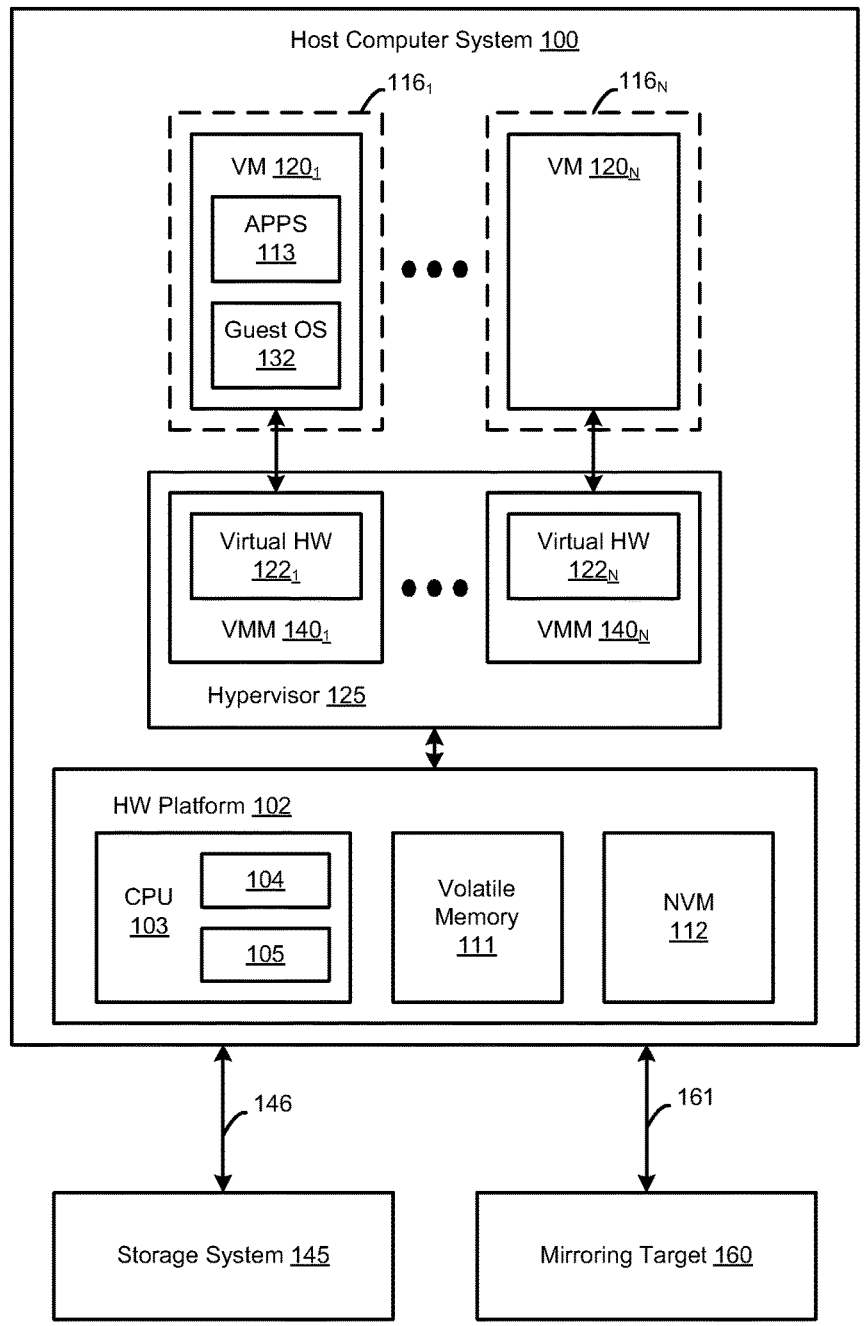
FIG. 1 is a computer system in which one or more embodiments may be implemented.

FIG. 1 is a computer system in which one or more embodiments may be implemented. Host computer system 100 may be constructed on a desktop, laptop or server grade hardware platform 102, such as an x86 architecture platform. Hardware platform 102 includes a central processing unit (CPU) 103, which includes one or more processing cores, one or more levels of CPU caches 104, and a memory controller 105, and host physical memory which includes volatile memory 111 (e.g., dynamic random access memory (DRAM)) and nonvolatile memory 112. Examples of nonvolatile memory 112 include phase change memory (PCM), magnetoresistive random access memory (MRAM), carbon nanotube based nonvolatile memory, and any other type of nonvolatile memory having read and write access latencies comparable to those of DRAM. Hardware platform 102 further includes other standard hardware components such as network interface controllers (not shown) that connect host computer system 100 to a mirroring target 160 (e.g., a remote computer system) over a network 161 and one or more host bus adapters (not shown) that connect host computer system 100 to a persistent storage device, illustrated herein as storage system 145, over a network 146.

A hypervisor 125 is installed on top of hardware platform 102. Hypervisor 125 supports multiple virtual machine execution spaces $116_1$-$116_N$, within each of which a VM process may be executed to instantiate corresponding VMs $120_1$-$120_N$. For each of VMs $120_1$-$120_N$, hypervisor 125 manages a corresponding virtual hardware platform (i.e., virtual hardware platforms $122_1$-$122_N$) that includes emulated hardware such as one or more virtual CPUs (vCPUs) and guest physical memory which includes guest volatile memory and guest nonvolatile memory. Each virtual hardware platform 122 supports the installation of a guest operating system (OS) (e.g., guest OS 132). In each instance, the guest OS provides user-level applications running in the virtual machine, e.g., APPS 113, an interface to the virtual hardware platform of the virtual machine.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 125 and their respective VMs. Alternatively, virtual hardware platforms $122_1$-$122_N$ may also be considered to be separate (e.g., as a component of its corresponding virtual machine since such platforms include the hardware emulation components for the virtual machine) from VMMs $140_1$-$140_N$, and VMMs $140_1$-$140_N$ may be considered to be separate from hypervisor 125. One example of hypervisor 125 that may be used is included as a component of VMware's vSphere® product, which is commercially available from VMware, Inc. of Palo Alto, Calif. It should further be recognized that other virtualized computer systems are contemplated, such as hosted virtual machine systems, where the hypervisor is implemented in conjunction with a host operating system.

Memory management of VMs 120 may be carried out by emulated memory management units (MMUs) that manage the mappings of guest virtual addresses directly to physical memory addresses, also referred to as machine memory addresses, using page tables known as "shadow" page tables. Memory management of VMs 120 may also be carried out by one or more MMUs configured in CPU 103 that support nested page walks. In such systems, a first set of page tables, referred to herein as guest page tables (gPTs), map the virtual address space of each application running in the virtual machines, referred to herein as guest virtual address space, to a physical address space that has been emulated for a virtual machine, referred to herein as guest physical address space. Additionally, a second set of page tables, referred to herein as nested page tables (NPTs) (also known in the art as extended page tables), map the guest physical address space to the address space of machine memory, referred to herein as machine memory address space. Both the first and second sets of page tables are hierarchically arranged and a pointer to the top-level, root table for each set of page tables is stored in a distinct register. In x86 architectures that support nested page walks, the register that stores a pointer to the root table of the gPTs is known as the gCR3 register and the register that stores a pointer to the root table of the NPTs is known as the nCR3 register. It should be recognized that non-x86 architectures employing guest page tables and nested page tables, or the like, may have different structures and accessed in a different manner.

In the description of embodiments provided below, memory management of VMs 120 is carried out by MMUs configured in CPU 103 that support nested page walks. However, it should be recognized that features of embodiments described herein may also be applied to systems that employ emulated MMUs for memory management.

Figure 2A:
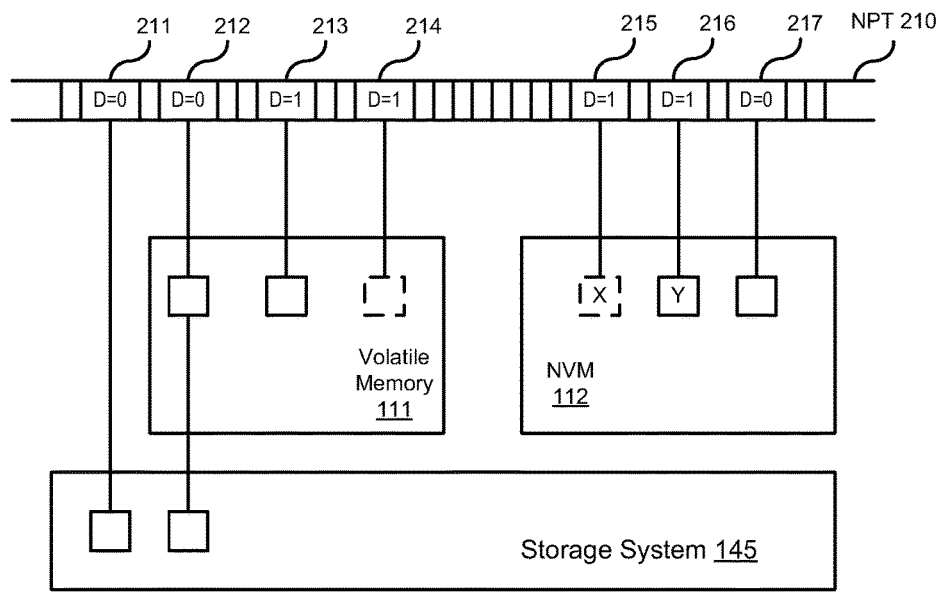
FIGS. 2A and 2B are conceptual diagrams showing mappings of pages of volatile memory and nonvolatile memory.
Figure 2B:
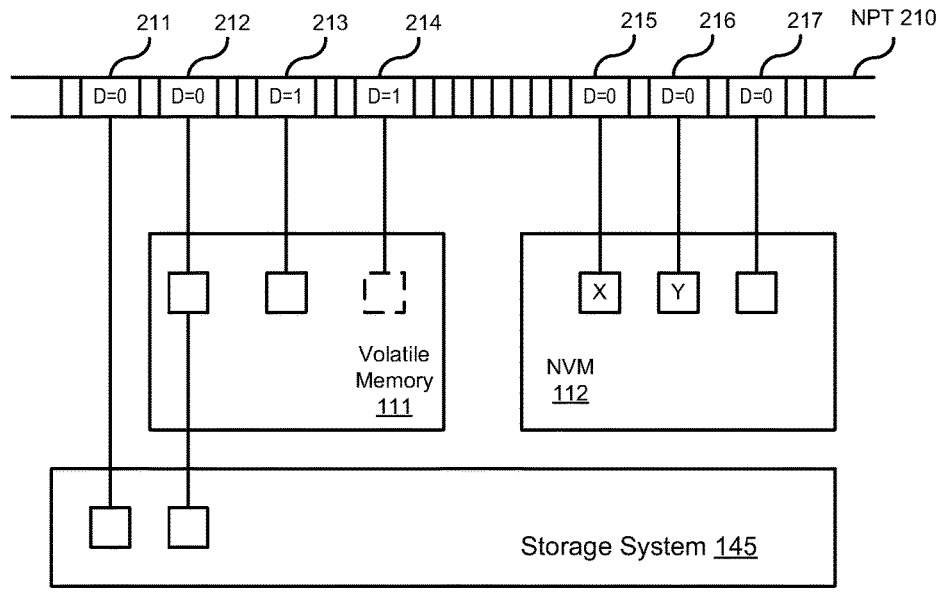

FIGS. 2A and 2B are conceptual diagrams showing mappings of pages of volatile memory and nonvolatile memory, in particular mappings of the pages from the guest physical memory space to the machine memory space via nested pages tables (NPT) 210 and page table entries (PTEs) of NPT 210. Each PTE includes inter alia a dirty bit (indicated as D) and a pointer to a page in volatile memory 111, a page in a swap space for volatile memory 111 provisioned in storage system 145, or a page in nonvolatile memory 112. A PTE of a page has its dirty bit set to 1 (i.e., D=1) when its contents are modified (i.e., dirtied). This dirty bit is cleared (i.e., D is changed from 1 to 0) for pages in volatile memory 111 in the conventional manner, i.e., when the modifications are stored persistently in storage system 145. For pages of nonvolatile memory 112, this dirty bit is cleared, as will be further described below, when the modifications are stored persistently in nonvolatile memory 112 and transmitted to the mirroring target.

When a page is modified, the modifications (also referred to herein as "dirty contents") are first stored in cache 104, more specifically, in one or more lines of cache 104. In the embodiments illustrated herein, cache 104 is divided into 64-byte lines and each cache line addresses a 64-byte portion of a page in volatile memory 111 or nonvolatile memory 112, which has a much larger size, e.g., 4 KB. Cache 104 also maintains a dirty bit for each cache line and the dirty bit for each cache line in which the page modifications are stored is set to 1. This dirty bit is not cleared (set to 0) until the page modifications are flushed into volatile memory 111 or nonvolatile memory 112.

In conventional systems, when the cache becomes full, various lines of the cache are evicted according to various known techniques, such as least recently used (LRU) techniques. In addition, an instruction to flush the cache, known as a "flush cache" instruction, is issued by an application and causes the CPU to flush all dirty contents of cache 104 into volatile memory 111. In the embodiments described herein, an instruction referred to herein as "NVM flush" instruction is made available to applications. When an application issues an NVM flush instruction, the CPU in response flushes dirty contents of cache 104 that contain modifications to pages of nonvolatile memory 112, into the corresponding pages, so that such modifications will be stored persistently in nonvolatile memory 112.

In FIGS. 2A and 2B, the pages corresponding to PTE 211 and PTE 212 are illustrative of volatile memory pages that have no dirty content. As such, the dirty bits of PTE 211 and PTE 212 are 0. By contrast, the pages corresponding to PTE 213 and PTE 214 are illustrative of volatile memory pages that contain dirty contents. As such, the dirty bits of PTE 213 and PTE 214 are 1. In the case of PTE 213, the dirty contents are stored in cache 104 and have been flushed into volatile memory 111. In the case of PTE 214, the dirty contents are stored in cache 104 and have not yet been flushed into volatile memory 111.

PTEs 211-214 are each mapped to a page in storage system 145 or volatile memory 111. In contrast, PTEs 215, 216, 217 are each mapped to a page in nonvolatile memory 112. The pages corresponding to PTE 215 and PTE 216 are illustrative of nonvolatile memory pages that contain dirty contents. As such, the dirty bits of PTE 215 and PTE 216 are 1. In the case of PTE 215, the dirty contents are stored in cache 104 and have not yet been flushed into nonvolatile memory 112. In the case of PTE 216, the dirty contents are stored in cache 104 and have been flushed into nonvolatile memory 112. The page corresponding to PTE 217 is illustrative of a nonvolatile memory page that has no dirty content and as such the dirty bit of PTE 217 is 0.

According to embodiments, when contents of a page in nonvolatile memory 112 are modified and stored in cache 104 and the dirty contents are flushed into nonvolatile memory 112, the dirty bit for that page is not cleared (i.e., set to 0) until the dirty contents are mirrored. FIG. 2B shows the result of such flushing and mirroring. In the case of PTE 215, the dirty contents which are stored in cache 104, are first flushed into page X and then transmitted to the mirroring target. As a result, the dirty bit of PTE 215 is changed to 0 as shown in FIG. 2B. In the case of PTE 216, the dirty contents which have already been flushed into page Y, are transmitted to the mirroring target. As a result, the dirty bit of PTE 216 is changed to 0 as shown in FIG. 2B.

The mirroring of the dirty contents of a nonvolatile memory page may triggered by the execution of an NVM flush instruction or periodically. FIG. 3 is a flow diagram of a method carried out by the hypervisor in which the steps of mirroring are executed in response to and upon completion of an NVM flush instruction issued by a guest application running in a VM, i.e., a guest NVM flush instruction. The method begins at step 302 when the execution of the guest NVM flush instruction traps into the hypervisor, and causes the application (as well as any other applications running in the VM on the same vCPU) to be halted. At step 304, the hypervisor issues a host NVM flush instruction. In response to the host NVM flush instruction, CPU 103 flushes dirty contents of cache 104 that contain modifications to pages of nonvolatile memory 112 into the corresponding pages of nonvolatile memory 112, so that such modifications will be stored persistently in nonvolatile memory 112. At step 312, upon completion of the host NVM flush instruction by CPU 103, mirroring is executed (step 312). The steps of mirroring are set forth in FIG. 4. After mirroring is executed, the hypervisor at step 314 exits from the trap so that the execution of the application (and any other applications running in the VM on the same vCPU) can be resumed.

FIG. 4 is a flow diagram of a method of mirroring that is carried out by the hypervisor. At step 402, the hypervisor scans page table entries of NPT 210, referred to as "nested PTE," and examines the nested PTE corresponding to a next page in nonvolatile memory 112. If the examined page is dirty (e.g., D=1), the contents of the page are mirrored in accordance with step 406 through step 416. If the examined page is not dirty (e.g., D=0), the flow jumps to step 418 where the hypervisor determines whether there are any more pages in nonvolatile memory 112 to be examined. If there are more pages in nonvolatile memory 112 to be examined, the method returns to step 402. If there are none, the method terminates.

In the embodiment illustrated in FIG. 4, the hypervisor performs mirroring in a manner that minimizes network bandwidth. To achieve this, copies of "hot" pages (e.g., pages that are dirtied frequently) are maintained so that only the dirtied portions of these pages are transmitted to a mirroring target each time these pages are dirtied. In the example implementation, the hypervisor checks at step 406 if a prior copy of the dirty page exists. If the prior copy exists, the hypervisor performs a diff operation on the dirtied page with respect to the prior copy (step 408). The size of the resulting diff file dictates whether the diff file is transmitted to the mirroring target or the entire page is transmitted to the mirroring target. If the size is not greater than a threshold size (e.g., less than or equal to 50% of page size), as determined at step 410, the diff file is sent to the mirroring target at step 412. On the other hand, if the size is greater than the threshold size (e.g., greater than 50% of page size), as determined at step 410, the entire page is sent to the mirroring target at step 414. Step 416 is executed after steps 412 and 414. At step 416, the hypervisor clears the dirty bit of the dirty page and stores a copy of the dirty page if the page is determined to be hot. The determination of whether a page is hot or not may be made using the techniques disclosed in U.S. patent application Ser. No. 12/834,662, filed Jul. 12, 2010 and entitled "Online Classification of Memory Pages Based on Activity Level," the entire contents of which are incorporated by reference herein. After step 416, step 418 is executed in the manner described above.

Alternative embodiments may employ a simpler form of mirroring where the entire dirty page is transmitted to the mirroring target all the time without regard to how much of the page has been dirtied since the last mirroring operation.

In the remaining embodiments, mirroring is executed periodically and asynchronously with respect to execution of the NVM flush instruction. In addition, the execution of the NVM flush instruction traps into a guest driver instead of the hypervisor.

Figures 5A, 5B:
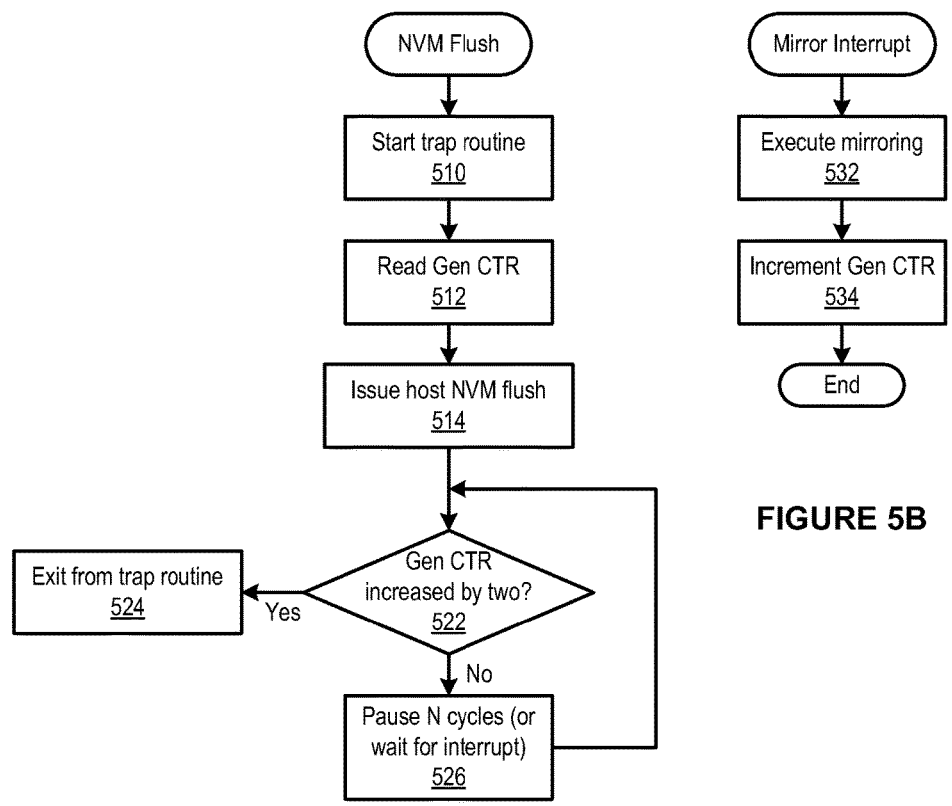
FIG. 5A is a flow diagram showing a method that is executed in accordance with a second embodiment when an NVM flush instruction is executed.
FIG. 5B shows steps of a periodically executed mirroring thread that is paired with the method of FIG. 5A.

FIG. 5A is a flow diagram of a method according to an embodiment that is carried out by the guest driver in response to an NVM flush instruction issued by a guest application running in a VM. The method begins at step 510 when the execution of the NVM flush instruction traps into the guest driver to cause the application to be halted. Then, the guest driver reads the value of a generator counter (which is incremented by a mirroring thread according to the method described below in conjunction with FIG. 5B) at step 512 and issues a host NVM flush instruction step 514. In response to the host NVM flush instruction, CPU 103 flushes dirty contents of cache 104 that contain modifications to pages of nonvolatile memory 112 into the corresponding pages of nonvolatile memory 112, so that such modifications will be stored persistently in nonvolatile memory 112. At step 522, upon completion of the host NVM flush instruction by CPU 103, the guest driver reads the value of the generator counter and compares it with the value read at step 512. If the value increased by two, the guest driver at step 524 exits from the trap and the execution of the application is resumed. If the value did not increase by two, the guest driver at step 524 pauses for a predetermined number of CPU cycles (N CPU cycles) and executes step 522 again after N CPU cycles. Alternatively, instead of pausing for N CPU cycles, the guest driver at step 524 may wait for an interrupt which is programmed to be triggered whenever the generation counter is incremented.

FIG. 5B is a flow diagram of a mirroring method that is carried out by a background thread upon occurrence of a mirror interrupt which is generated periodically, e.g., once every 10 milliseconds. At step 532, the background thread executes the mirroring method of FIG. 4. Upon completion of this mirroring method, the background thread increments the generation counter by one at step 534 and then terminates.

Figures 6A, 6B:
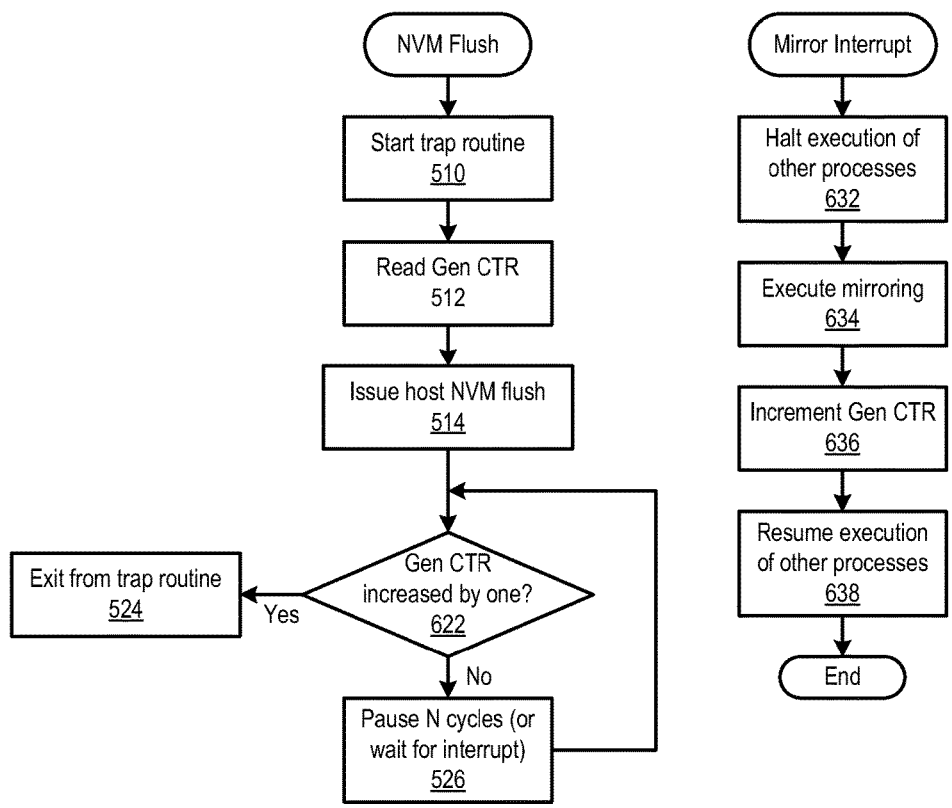
FIG. 6A is a flow diagram showing a method that is executed in accordance with a third embodiment when an NVM flush instruction is executed.
FIG. 6B shows steps of a periodically executed mirroring thread that is paired with the method of FIG. 6A.

FIG. 6A is a flow diagram of a method according to another embodiment, that is carried out by the guest driver in response to an NVM flush instruction issued by a guest application running in a VM. The method of FIG. 6A is identical to the method of FIG. 5A except the generation counter is incremented by a mirroring thread according to the method of FIG. 6B in place of the method of FIG. 5B) and step 622 is executed in place of step 522. At step 622, the guest driver reads the value of the generator counter and compares it with the value read at step 512 to determine whether or not the value increased by one. If the value increased by one, the guest driver executes step 524 as described above. If the value did not increase by one, the guest driver executes step 526 as described above.

FIG. 6B is a flow diagram of a mirroring method that is carried out by a background thread upon occurrence of a mirror interrupt which is generated periodically, e.g., once every 10 milliseconds. The background thread at step 632 halts the execution of all other processes so that pages of memory, in particular pages of nonvolatile memory 112, are not dirtied while the background thread is running. Then, the background thread at step 634 executes the mirroring method of FIG. 4. Upon completion of this mirroring method, the background thread increments the generation counter by one at step 636. Thereafter, the background thread resumes execution of the halted processes at step 638, and then terminates.

The embodiment of FIGS. 5A and 5B and the embodiment of FIGS. 6A and 6B have two advantages over the embodiment of FIG. 3. First, they avoid trapping to the hypervisor saving several thousands of CPU cycles and, second, it allows other guest applications to continue execution while the application that issued the NVM flush instruction waits for dirty page mirroring. These and other advantages are described in U.S. patent application Ser. No. 12/397,914, entitled "Managing Latency Introduced by Virtualization" and filed on Mar. 4, 2009, the entire contents of which are incorporated by reference herein.

Figure 7:
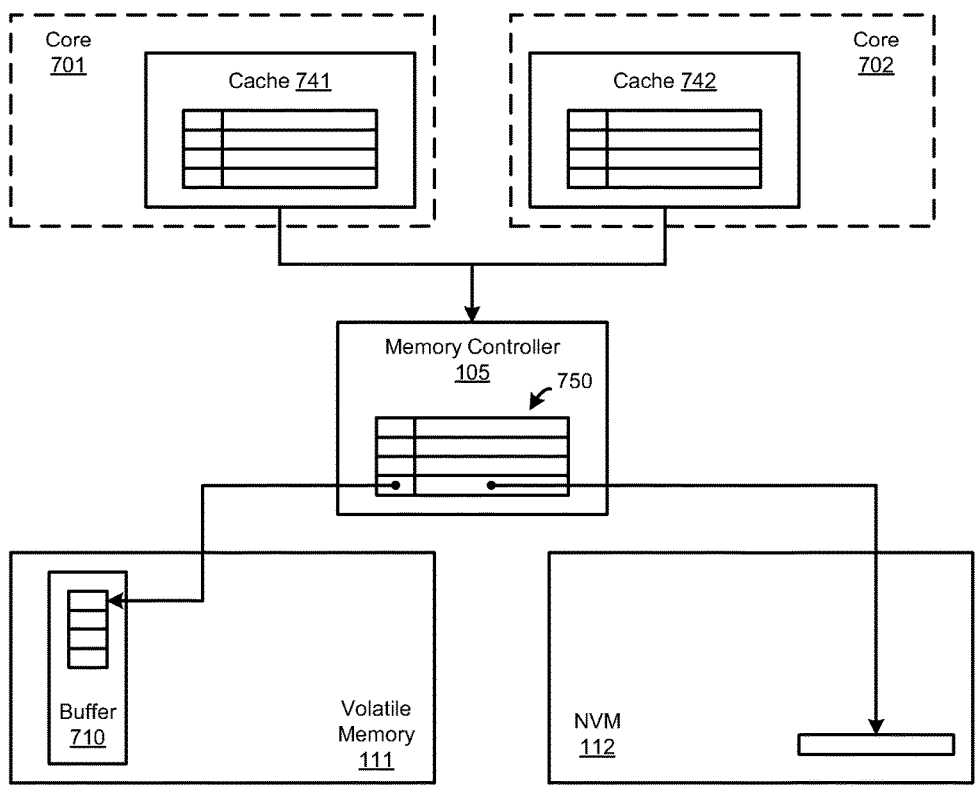
FIG. 7 is a conceptual diagram showing a memory controller that stores nonvolatile memory addresses to which dirty cache lines are written in a buffer.

As a way to further optimize mirroring, in additional embodiments, memory controller 105 is configured to store memory addresses of dirty lines of cache 104 that contain modifications to pages of nonvolatile memory 112, in a buffer that is set up by the hypervisor in volatile memory 111. FIG. 7 is a conceptual diagram of memory controller 105 that is configured in such a manner.

In the embodiment illustrated in FIG. 7, two processing cores, core 701 with cache 741 and core 702 with cache 742, are shown. In response to a host NVM flush instruction, memory controller 105 first stores the dirty lines of the corresponding cache that contain modifications to pages of nonvolatile memory 112 in write buffer 750 of memory controller 105 and then stores (1) data of the dirty cache lines in nonvolatile memory 112 and (2) memory addresses of nonvolatile memory 112 at which the data of the dirty cache lines are stored, in a buffer 710, which in one embodiment is a circular buffer. In addition, when a cache (cache 741 or cache 742) becomes full, various lines of the cache are evicted by memory controller 105 according to known techniques, such as least recently used (LRU) techniques. During this eviction process, memory controller 105 stores (1) data of the evicted cache lines that contain modifications to pages of nonvolatile memory 112, in nonvolatile memory 112, and (2) memory addresses of nonvolatile memory 112 at which the data of the evicted cache lines are stored, in buffer 710.

Figure 8:
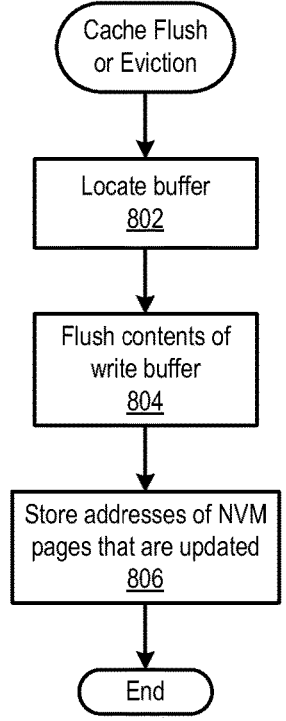
FIG. 8 is a flow diagram of a method of storing nonvolatile memory addresses to which dirty cache lines are written in the buffer.

FIG. 8 is a flow diagram of a method carried out by memory controller 105 to populate buffer 710 in response to the two events discussed above, namely the execution of the host NVM flush instruction and eviction of a cache line that contains modifications to pages of nonvolatile memory 112. This method begins at step 802, where memory controller 105 locates buffer 710 within volatile memory 111. At step 804, memory controller 105 flushes the contents of write buffer 750 to either volatile memory 111 and nonvolatile memory 112. When flushing to nonvolatile memory 112, the memory address of nonvolatile memory 112 at which the flushed contents are stored, are added to buffer 710 (step 806).

Figure 9:
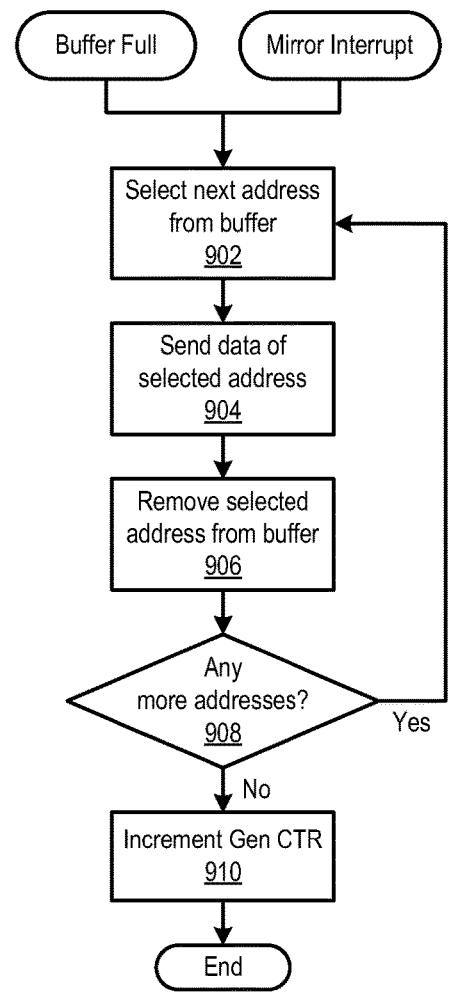
FIG. 9 is a modification of the mirroring method of FIG. 5B that employs nonvolatile memory addresses stored in the buffer.

When buffer 710 is employed in the manner described above, the mirroring method of FIG. 5B may be replaced by the mirroring method of FIG. 9, which is carried out by a background thread that is triggered when buffer 710 becomes full or upon occurrence of a mirror interrupt which is generated periodically, e.g., once every 10 milliseconds. In general, this background thread performs mirroring of data that is located at memory addresses stored in buffer 710. The mirroring of data is performed in units of 64 bytes or some other size that is equal to the cache line size because each memory address references data of one cache line. More specifically, at step 902, the background thread selects a next memory address from buffer 710. Then, at step 904, the background thread reads data from the selected memory address and sends the data to nonvolatile memory 112 for storage at the selected memory address and also to a mirroring target. At step 906, the background thread removes the selected memory address from buffer 710. The background thread at step 908 determines whether there are any more memory addresses in buffer 710. If there are more memory addresses in buffer 710, the method returns to step 902. If there are none, the background thread executes step 910 to increment the generation counter by one. The method terminates after step 910.

Figure 10:
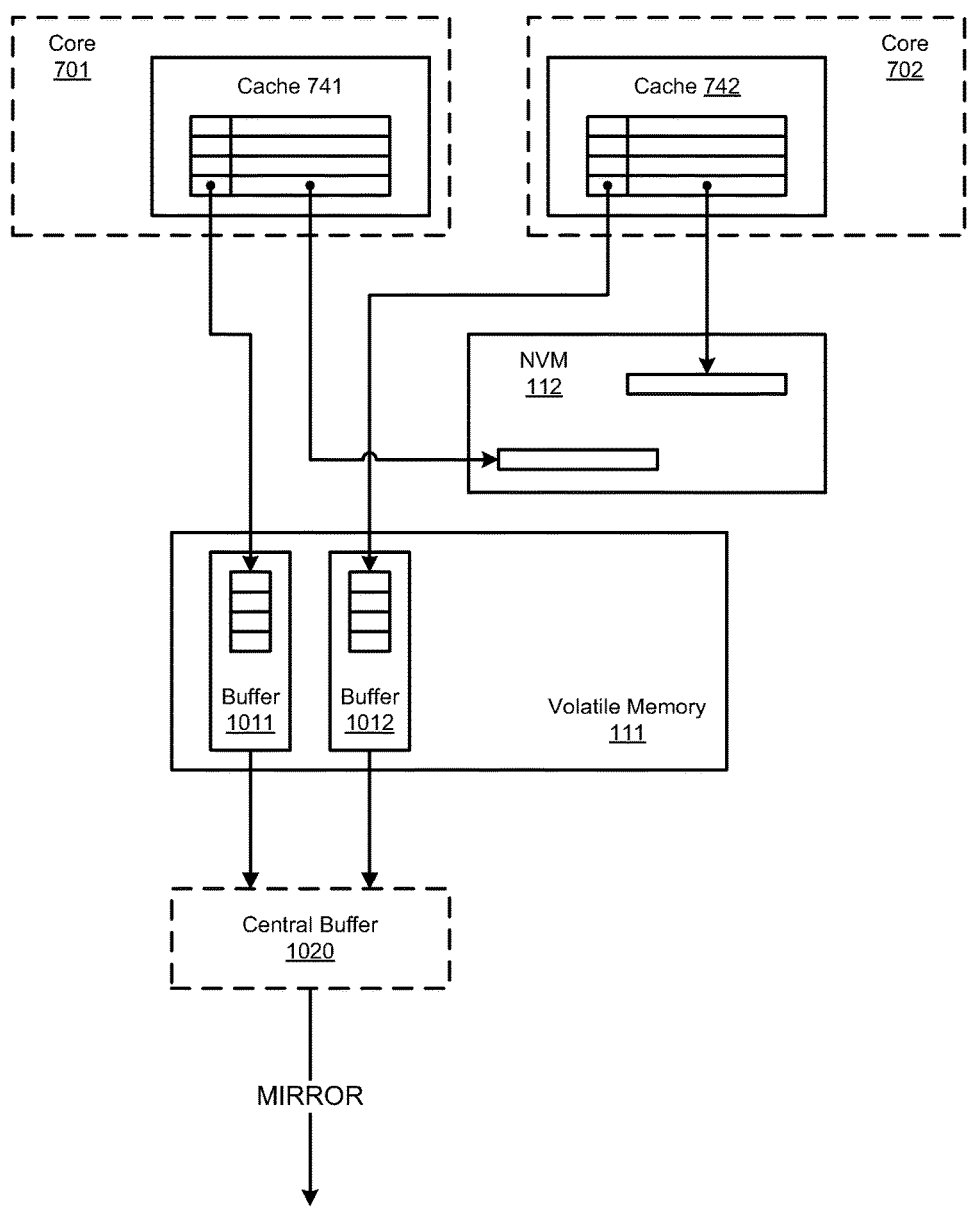
FIG. 10 is a conceptual diagram showing multiple processing cores each having a cache configured to track nonvolatile memory addresses to which dirty cache lines are to be written in a dedicated buffer, and a central buffer for collecting the nonvolatile memory addresses stored in the dedicated buffers.

In further embodiments, each controller of processing core caches is configured to store memory addresses of dirty lines of its corresponding cache that contain modifications to pages of nonvolatile memory 112, in a dedicated buffer that is set up by the hypervisor in volatile memory 111. In the example shown in FIG. 10, buffer 1011 is set up for cache 741 and buffer 1012 is set up for cache 742. In the embodiment illustrated herein, the storing of the memory addresses in the dedicated buffer is triggered when modifications to a page of nonvolatile memory 112 are stored in a cache line (e.g., a line of cache 741 or cache 742) and the dirty state of the cache line transitions from clean to dirty.

Figure 11:
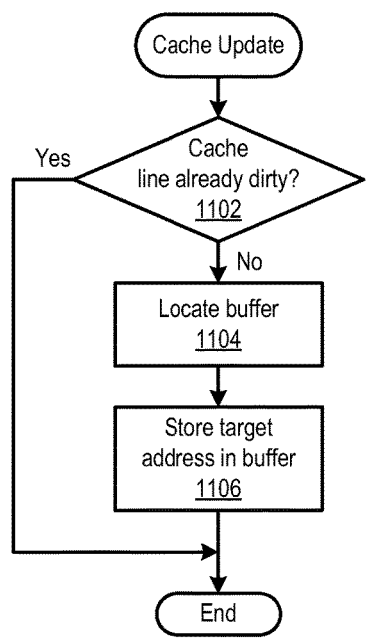
FIG. 11 is a flow diagram of a method of tracking nonvolatile memory addresses to which dirty cache lines are written in response to a cache update.

FIG. 11 is a flow diagram of a method carried out by a cache controller in response to an update to a cache line. At step 1102, the cache controller checks the current dirty state of the cache line being updated. If the current dirty state is clean, the cache controller locates the address of the dedicated buffer in volatile memory 111 (step 1104) and stores the memory address of nonvolatile memory 112 at which contents of the updated cache line are to be stored in the dedicated buffer (step 1106). The method terminates after step 1106. If the current dirty state is dirty, steps 1104 and 1106 are skipped and the method terminates.

Figure 12:
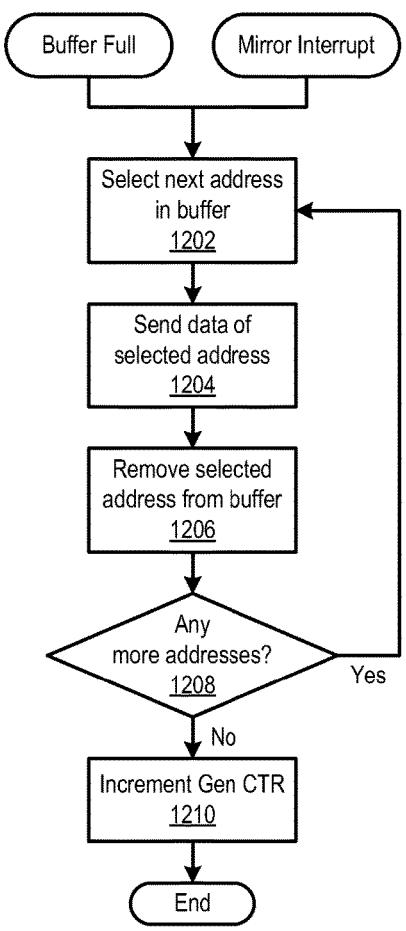
FIG. 12 is a flow diagram of a method of mirroring the dirty cache line data periodically or when any of the dedicated buffers becomes full.

When dedicated buffers are employed in the manner described above, the mirroring method of FIG. 5B may be replaced by the mirroring method of FIG. 12, which is carried out by a background thread that is triggered when any of the dedicated buffers becomes full or upon occurrence of a mirror interrupt which is generated periodically, e.g., once every 10 milliseconds. At step 1202, the background thread selects a next memory address from the dedicated buffer. Then, at step 1204, the background thread reads data from the selected memory address and sends the data to nonvolatile memory 112 for storage at the selected memory address and also to a mirroring target. At step 1206, the background thread removes the selected memory address from the dedicated buffer. The background thread at step 1208 determines whether there are any more memory addresses in the dedicated buffer. If there are more memory addresses in the dedicated buffer, the method returns to step 1202. If there are none, the background thread executes step 1210 to increment the generation counter by one. The method terminates after step 1210.

Accordingly, when either buffer 1011 or buffer 1012 becomes full, this triggers the mirroring method for the full buffer as described above. Alternatively, when either buffer 1011 or buffer 1012 becomes full, this event may trigger the contents of the full buffer to be copied into a central buffer 1020 (shown in FIG. 10) as described below in conjunction with FIG. 13 and any mirroring is carried out using the memory addresses stored in central buffer 1020 as described below in conjunction with FIG. 14.

Figures 13, 14:
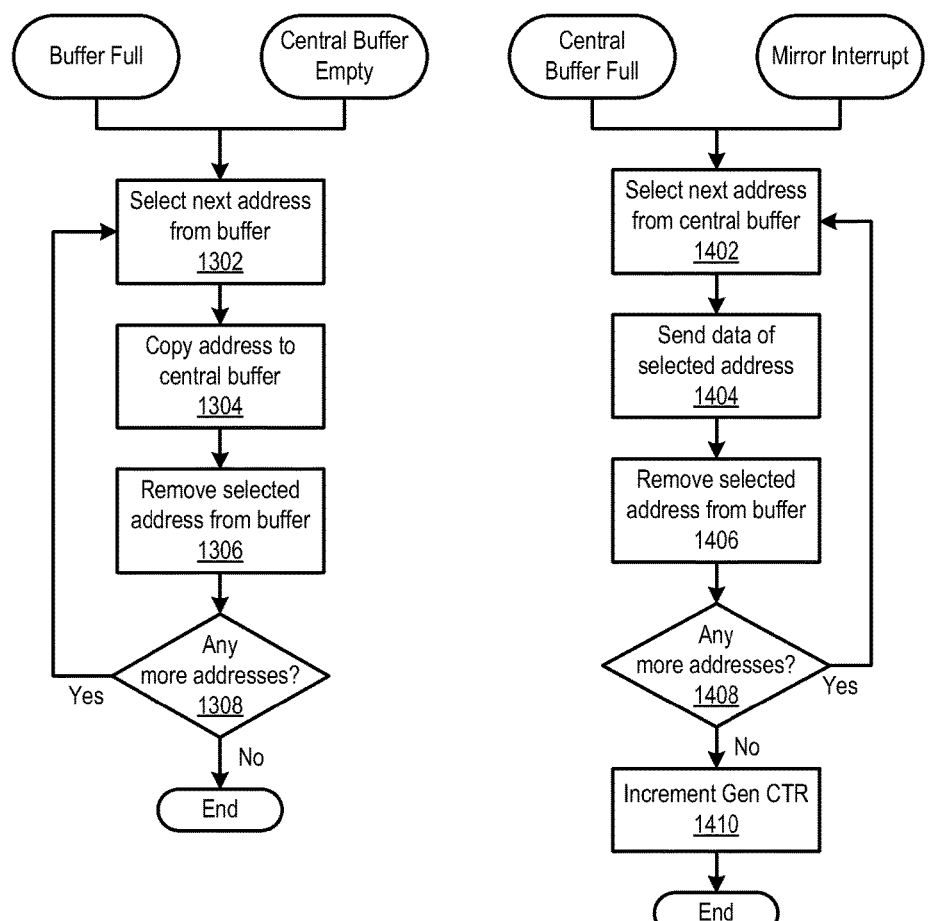
FIG. 13 is a flow diagram of a method of populating a central buffer with nonvolatile memory addresses stored in the dedicated buffers.
FIG. 14 is another modification of the mirroring method of FIG. 5B that employs nonvolatile memory addresses stored in the central buffer.

The method of FIG. 13 is carried out by a background thread that is triggered when any of the dedicated buffers becomes full and also when central buffer 1020 becomes empty. At step 1302, the background thread selects a next memory address from a dedicated buffer that is full or a dedicated buffer that is the most full. Then, the background thread copies the selected memory address to central buffer 1020 at step 1304 and removes the selected memory address from the dedicated buffer at step 1306. The background thread at step 1308 determines whether there are any more memory addresses in the dedicated buffer. If there are more memory addresses in the dedicated buffer, the method returns to step 1302. If there are none, the method terminates.

When central buffer 1020 is employed, the mirroring method of FIG. 5B may be replaced by the mirroring method of FIG. 14, which is carried out by a background thread that is triggered when central buffer 1020 becomes full or upon occurrence of a mirror interrupt which is generated periodically, e.g., once every 10 milliseconds. At step 1402, the background thread selects a next memory address from central buffer 1020. Then, at step 1404, the background thread reads data from the selected memory address and sends the data to nonvolatile memory 112 for storage at the selected memory address and also to a mirroring target. At step 1406, the background thread removes the selected memory address from central buffer 1020. The background thread at step 1408 determines whether there are any more memory addresses in central buffer 1020. If there are more memory addresses in central buffer 1020, the method returns to step 1402. If there are none, the background thread executes step 1410 to increment the generation counter by one. The method terminates after step 1410.

The embodiments described herein provide techniques for mirroring data stored persistently in nonvolatile memory 112 of a virtualized computer system. It should be recognized that such techniques may be implemented in a non-virtualized computer system having an operating system and applications running on top of the operating system, where individual applications during execution would be dirtying pages of nonvolatile memory 112 and dirtied portions of such pages are transmitted to a mirroring target.

Further, some of the particular techniques for reducing the network bandwidth during mirroring may also be applied to data stored in volatile memory. For example, in a checkpointing process, where dirty contents of volatile memory pages are transmitted to a mirroring target, the methods described in conjunction with FIGS. 8 and 11 may be employed to track particular sub-regions of volatile memory pages that are dirtied and transmit only the contents in the dirtied sub-regions of volatile memory pages to the mirroring target. In this manner, copies of pages transmitted to the mirroring target during the prior checkpoint iteration need not be saved and the operation to determine the differences between the dirtied page and the saved page need not be executed. As a result, volatile memory space and CPU processing cycles are conserved.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media (e.g., tangible computer readable storage media). The term computer readable medium (e.g., tangible computer readable storage medium) refers to any data storage device that can store data which can thereafter be input to a computer system computer readable media and may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. In a computer system having one or more processors, volatile memory, nonvolatile memory, and a processor cache, a method of mirroring updates to the nonvolatile memory, comprising:
    determining that an instruction to flush the processor cache into the nonvolatile memory has been issued, wherein the processor cache contains cached data and memory addresses of both the volatile memory and the non-volatile memory, and a memory space of the volatile memory and the nonvolatile memory is logically partitioned into pages;
    in response to the issuance of the flush instruction when dirty contents of pages of the nonvolatile memory are cached in cache lines of the processor cache such that a dirty indication in each of page table entries of the pages of the nonvolatile memory is set, writing the dirty contents of the pages of the nonvolatile memory that are cached in the cache lines of the processor cache into the pages of the nonvolatile memory at corresponding memory addresses of the nonvolatile memory stored in the cache lines; and
    transmitting at least the cache lines of the processor cache that have been written into the nonvolatile memory to a remote computer system,
    wherein after said writing and prior to said transmitting, not clearing the dirty indication in each of the pages table entries of the pages of the nonvolatile memory, and responsive to said transmitting, clearing the dirty indication in each of the page table entries of the pages of the nonvolatile memory.

2. The method of claim 1, wherein upon completion of said writing and in response thereto, a processing thread that carries out said transmitting is executed.

3. The method of claim 1, wherein said writing and said transmitting are executed in independent processing threads.

4. The method of claim 3, further comprising:
    halting an application that issued the flush instruction; and
    after said transmitting, resuming the application.

5. The method of claim 4, wherein the processing thread that carries out said transmitting is executed periodically.

6. The method of claim 5, further comprising: each time the processing thread completes execution, changing a counter value, wherein the application is resumed according to the changed counter value.

7. The method of claim 1, wherein the processor cache includes a plurality of clean or dirty cache lines each configured to store the cache data and address corresponding to the memory addresses of the non-volatile memory.

8. The method of claim 7, wherein said transmitting includes:
    identifying the pages of the nonvolatile memory that are indicated as having been modified; and
    transmitting at least the modified portions of the identified pages of the non-volatile memory to the remote computer system.

9. The method of claim 8, wherein said transmitting includes transmitting the modified portions of the identified pages of the nonvolatile memory to the remote computer system without transmitting unmodified portions of the identified pages of the nonvolatile memory to the remote computer system.

10. The method of claim 7, further comprising:
    each time a clean cache line of the processor cache is updated with the cached data and a memory address of the memory addresses of the nonvolatile memory, storing the memory address of the memory addresses of the nonvolatile memory in a buffer,
    wherein said transmitting includes reading memory addresses stored in the buffer, reading data from the nonvolatile memory at the memory addresses stored in the buffer and transmitting the data read from the nonvolatile memory at the memory addresses stored in the buffer to the remote system.

11. The method of claim 10, wherein said transmitting is triggered when the buffer becomes full.

12. The method of claim 10, wherein said transmitting is triggered periodically.

13. The method of claim 1, further comprising:
    upon said writing, storing memory addresses of the nonvolatile memory at which the dirty contents are written, in a buffer, wherein said transmitting includes reading the memory addresses stored in the buffer, reading the dirty contents from the nonvolatile memory at the memory addresses stored in the buffer, and transmitting the dirty contents read from the nonvolatile memory at the memory addresses stored in the buffer to the remote computer system.

14. The method of claim 13, wherein said transmitting is triggered when the buffer becomes full.

15. The method of claim 13, wherein said transmitting is triggered periodically.

16. A non-transitory computer readable medium comprising instructions to be executed in a computer system having one or more processors, volatile memory, nonvolatile memory, and a processor cache to perform a method of mirroring updates to the nonvolatile memory, comprising the steps of:
  determining that an instruction to flush the processor cache into the nonvolatile memory has been issued, wherein the processor cache contains cached data and memory addresses of both the volatile memory and the non-volatile memory, and a memory space of the volatile memory and the nonvolatile memory is logically partitioned into pages;
  in response to the issuance of the flush instruction when dirty contents of pages of the nonvolatile memory are cached in cache lines of the processor cache such that a dirty indication in each of page table entries of the pages of the nonvolatile memory is set, writing the dirty contents of the pages of the nonvolatile memory that are cached in the cache lines of the processor cache into the pages of the nonvolatile memory at corresponding memory addresses of the nonvolatile memory stored in the cache lines; and
  transmitting at least the cache lines of the processor cache that have been written into the nonvolatile memory to a remote computer system,
  wherein after said writing and prior to said transmitting, not clearing the dirty indication in each of the pages table entries of the pages of the nonvolatile memory, and responsive to said transmitting, clearing the dirty indication in each of the page table entries of the pages of the nonvolatile memory.

17. The non-transitory computer readable medium of claim 16, wherein upon completion of said writing and in response thereto, a processing thread that carries out said transmitting is executed.

18. The non-transitory computer readable medium of claim 16, wherein said writing and said transmitting are executed in independent processing threads.

19. A computer system comprising:
  one or more processors;
  volatile memory;
  nonvolatile memory; and
  a processor cache, wherein the processor cache contains cached data and memory addresses of both the volatile memory and the non-volatile memory, and a memory space of the volatile memory and the nonvolatile memory is logically partitioned into pages, and
  wherein the one or more processors are programmed to execute a method of mirroring updates to the nonvolatile memory, comprising the steps of:
  determining that an instruction to flush the processor cache into the nonvolatile memory has been issued;
  in response to the issuance of the flush instruction when dirty contents of pages of the nonvolatile memory are cached in cache lines of the processor cache such that a dirty indication in each of page table entries of the pages of the nonvolatile memory is set, writing the dirty contents of the pages of the nonvolatile memory that are cached in the cache lines of the processor cache into the pages of the nonvolatile memory at corresponding memory addresses of the nonvolatile memory stored in the cache lines; and
  transmitting at least the cache lines of the processor cache that have been written into the nonvolatile memory to a remote computer system,
  wherein after said writing and prior to said transmitting, not clearing the dirty indication in each of the pages table entries of the pages of the nonvolatile memory, and responsive to said transmitting, clearing the dirty indication in each of the page table entries of the pages of the nonvolatile memory.

20. The computer system of claim 19, wherein the volatile memory includes a buffer for storing memory addresses of the nonvolatile memory at which dirty lines of the processor cache are stored.

* * * * *